United States Patent
Brown et al.

(10) Patent No.: US 6,545,084 B2
(45) Date of Patent: Apr. 8, 2003

(54) COATING COMPOSITION

(75) Inventors: Albert Benner Brown, Doylestown, PA (US); Ralph Craig Even, Blue Bell, PA (US); Dennis Paul Lorah, Lansdale, PA (US); Alvin Michael Maurice, Lansdale, PA (US); Robert Victor Slone, Quaker, PA (US); Xun Tang, Dresher, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/981,349

(22) Filed: Oct. 17, 2001

(65) Prior Publication Data

US 2002/0183446 A1 Dec. 5, 2002

Related U.S. Application Data

(60) Provisional application No. 60/270,774, filed on Feb. 23, 2001.

(51) Int. Cl.$^7$ .............................. C08L 31/02; C08L 33/02
(52) U.S. Cl. ....................... 524/556; 524/560; 524/832; 526/227; 526/230
(58) Field of Search ................................. 526/227, 230; 524/556, 560, 832

(56) References Cited

U.S. PATENT DOCUMENTS

| | | | | |
|---|---|---|---|---|
| 5,032,462 A | * | 7/1991 | Kim | 428/501 |
| 5,540,987 A | | 7/1996 | Mudge et al. | 428/288 |
| 5,753,746 A | | 5/1998 | Rupaner et al. | 524/555 |
| 6,403,703 B1 | * | 6/2002 | Slone | 524/832 |

FOREIGN PATENT DOCUMENTS

EP 1078938 A1 2/2001

* cited by examiner

*Primary Examiner*—Judy M. Reddick
(74) *Attorney, Agent, or Firm*—Ronald D. Bakule

(57) ABSTRACT

An aqueous composition suitable for use, when dry, as an improved coating is provided including an aqueous emulsion polymer, the polymer having a glass transition temperature (Tg) from greater than 20° C. to 80° C., formed by the free radical polymerization of at least one ethylenically unsaturated nonionic acrylic monomer and 0–7.5%, by weight based on the total weight of the polymer, ethylenically unsaturated acid monomer in the presence of 0.01–1.0%, by weight based on the total weight of the polymer, t-alkyl hydroperoxide, t-alkyl peroxide, or t-alkyl perester wherein the t-alkyl group includes at least 5 Carbon atoms and, optionally, at least one other oxidant. A method of preparing the emulsion polymer is also provided.

2 Claims, No Drawings

COATING COMPOSITION

CROSS REFERENCE TO RELATED PATENT APPLICATIONS

This is a non-provisional application of prior pending U.S. provisional application serial No. 60/270,774 filed Feb. 23, 2001.

This invention relates to an aqueous composition suitable for use when dry as an improved coating, a method for preparing an aqueous emulsion polymer suitable for use in an improved coating and methods for providing a coated substrate and for improving the scrub resistance of a coating. More particularly this invention relates to an aqueous composition including a aqueous emulsion polymer, the polymer having a glass transition temperature (Tg) from greater than 20° C. to 80° C., the polymer formed by the free radical polymerization of at least one ethylenically unsaturated nonionic acrylic monomer and 0–7.5%, by weight based on the total weight of the polymer, ethylenically unsaturated acid monomer, in the presence of 0.01–1.0%, by weight based on the total weight of the polymer, t-alkyl hydroperoxide, t-alkyl peroxide, or t-alkyl perester wherein the t-alkyl group includes at least 5 Carbon atoms and, optionally, at least one other oxidant, a method of preparing the emulsion polymer, a method for providing a coated substrate wherein the coating contains the emulsion polymer having a Tg from −20° C. to 80° C., and a method for improving the scrub resistance of a coating by including the emulsion polymer having a Tg from −20° C. to 80° C.

The present invention serves to provide an aqueous composition suitable for use when dry as an improved coating, by which is meant that the coating, "coating" herein including, for example, paint, clearcoat, topcoat, primer, paper coating, and leather coating, expressly excluding elastomeric coating, caulk, sealant, and pressure sensitive adhesive, exhibits improvement in at least one of scrub resistance, marker stain blocking, corrosion resistance over metal, flash rust resistance over metal, gloss(higher), exterior durability as indicated, for example, by gloss retention or cracking resistance, adhesion to substrates, water vapor permeability, and water swelling, relative to a coating in which an emulsion polymer of the same Tg not so formed is employed.

U.S. Pat. No. 5,540,987 discloses emulsion polymers including at least 50% vinyl acetate having low residual formaldehyde and providing saturated cellulosic webs having improved tensile strength. The polymers are formed by the use of an hydrophobic hydroperoxide and ascorbic acid initiator throughout the course of the reaction.

The problem faced by the inventors is the provision of an aqueous composition suitable for use when dry as an improved coating. Unexpectedly, the inventors found that the use of certain levels of t-alkyl hydroperoxide, t-alkyl peroxide, or t-alkyl perester wherein the t-alkyl group includes at least 5 Carbon atoms during the polymerization or even only in the last stages of the polymerization was sufficient to provide emulsion polymers which led to improved coatings properties.

In a first aspect of the present invention there is provided an aqueous coating composition comprising an aqueous emulsion polymer, the polymer having a glass transition temperature (Tg) from greater than 20° C. to 80° C., formed by the free radical polymerization of at least one ethylenically unsaturated nonionic acrylic monomer and 0–7.5%, by weight based on the total weight of the polymer, ethylenically unsaturated acid monomer in the presence of 0.01–1.0%, by weight based on the total weight of the polymer, t-alkyl hydroperoxide, t-alkyl peroxide, or t-alkyl perester wherein the t-alkyl group includes at least 5 Carbon atoms.

In a second aspect of the present invention there is provided a method for preparing an aqueous emulsion polymer suitable for use in a coating composition comprising forming an aqueous emulsion polymer, the polymer having a glass transition temperature (Tg) from greater than 20° C. to 80° C., formed by the free radical polymerization of at least one ethylenically unsaturated nonionic acrylic monomer and 0–7.5%, by weight based on the total weight of the polymer, ethylenically unsaturated acid monomer in the presence of 0.01–1.0%, by weight based on the total weight of the polymer, t-alkyl hydroperoxide, t-alkyl peroxide, or t-alkyl perester wherein the t-alkyl group includes at least 5 Carbon atoms.

In a third aspect of the present invention there is provided a method for providing a coated substrate comprising forming an aqueous coating composition comprising an aqueous emulsion polymer, the polymer having a glass transition temperature (Tg) from −20° C. to 80° C., formed by the free radical polymerization of at least one ethylenically unsaturated nonionic acrylic monomer and 0–7.5%, by weight based on the total weight of the polymer, ethylenically unsaturated acid monomer in the presence of 0.01–1.0%, by weight based on the total weight of the polymer, t-alkyl hydroperoxide, t-alkyl peroxide, or t-alkyl perester wherein the t-alkyl group includes at least 5 Carbon atoms; applying the aqueous coating composition to the substrate; and drying, or allowing to dry, the aqueous composition.

In other aspects of the present invention there are provided a method for improving the scrub resistance of a coating, a method for improving the outdoor durability of a coating, and a method for improving the pick strength of a paper or paperboard coating.

This invention relates to an aqueous composition suitable for use when dry as a coating including an aqueous emulsion polymer, the polymer having a glass transition temperature (Tg) from greater than 20° C. to 80° C., formed by the free radical polymerization of at least one ethylenically unsaturated nonionic acrylic monomer and 0–7.5%, by weight based on the total weight of the polymer, ethylenically unsaturated acid monomer in the presence of 0.01–1.0%, by weight based on the total weight of the polymer, t-alkyl hydroperoxide, t-alkyl peroxide, or t-alkyl perester wherein the t-alkyl group includes at least 5 Carbon atoms and, optionally, at least one other oxidant.

The aqueous emulsion polymer contains at least one copolymerized ethylenically unsaturated nonionic acrylic monomer. By "nonionic monomer" herein is meant that the copolymerized monomer residue does not bear an ionic charge between pH=1–14.

The ethylenically unsaturated nonionic acrylic monomers include, for example, (meth)acrylic ester monomers including methyl acrylate, ethyl acrylate, butyl acrylate, 2-ethylhexyl acrylate, decyl acrylate, lauryl acrylate, methyl methacrylate, butyl methacrylate, isodecyl methacrylate, lauryl methacrylate, hydroxyethyl methacrylate, hydroxypropyl methacrylate. Other ethylenically unsaturated nonionic monomers which may be incorporated into the polymer include, for example, styrene and substituted styrenes; butadiene; vinyl acetate, vinyl butyrate and other vinyl esters; vinyl monomers such as vinyl chloride, vinyl toluene, and vinyl benzophenone; and vinylidene chloride. Preferred are all-acrylic, styrene/acrylic, and vinyl acetate/acrylic polymers. Preferred is a predominantly acrylic aqueous emulsion polymer. By "predominantly acrylic" herein is meant that the polymer contains greater than 50%, by weight, copolymerized units deriving from (meth)acrylic monomers such as, for example, (meth)acrylate esters, (meth)acrylamides, (meth)acrylonitrile, and (meth)acrylic acid. The use of the term "(meth)" followed by another term such as acrylate or acrylamide, as used throughout the disclosure, refers to both acrylates or acrylamides and methacrylates and methacrylamides, respectively.

The emulsion polymer contains from 0% to 7.5%, by weight based on total monomer weight, of a copolymerized monoethylenically-unsaturated acid monomer, based on the weight of the polymer, such as, for example, acrylic acid, methacrylic acid, crotonic acid, itaconic acid, fumaric acid, maleic acid, monomethyl itaconate, monomethyl fumarate, monobutyl fumarate, maleic anhydride, 2-acrylamido-2-methylpropane sulfonic acid, vinyl sulfonic acid, styrene sulfonic acid, 1-allyloxy-2-hydroxypropane sulfonic acid, alkyl allyl sulfosuccinic acid, sulfoethyl (meth)acrylate, phosphoalkyl (meth)acrylates such as phosphoethyl (meth)acrylate, phosphopropyl (meth)acrylate, and phosphobutyl (meth)acrylate, phosphoalkyl crotonates, phosphoalkyl maleates, phosphoalkyl fumarates, phosphodialkyl (meth)acrylates, phosphodialkyl crotonates, and allyl phosphate.

The emulsion polymer used in this invention may contain from 0% to 1%, by weight based on monomer weight, copolymerized multi-ethylenically unsaturated monomers such as, for example, allyl methacrylate, diallyl phthalate, 1,4-butylene glycol dimethacrylate, 1,2-ethylene glycol dimethacrylate, 1,6-hexanediol diacrylate, and divinyl benzene.

The glass transition temperature ("Tg") of the emulsion polymer is from is measured by differential scanning calorimetry (DSC) taking the mid-point in the heat flow versus temperature transition as the Tg value, the monomers and amounts of the monomers being selected to achieve the desired polymer Tg range as is well known in the art. The preferred Tg of the emulsion polymer described hereinabove for use in coatings is from −20° C. to 80° C., more preferably from 0° C. to 40° C.

The polymerization techniques used to prepare aqueous emulsion-polymers are well known in the art. In the emulsion polymerization process conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. The amount of surfactant used is usually 0.1% to 6% by weight, based on the weight of monomer. Either thermal or redox initiation processes may be used. The reaction temperature is maintained at a temperature lower than 120° C. throughout the course of the reaction. Preferred is a reaction temperature between 30° C. and 95° C., more preferably between 50° C. and 90° C. The monomer mixture may be added neat or as an emulsion in water. The monomer mixture may be added in one or more additions or continuously, linearly or not, over the reaction period or combinations thereof.

Conventional free radical initiators (oxidants) which may be used in addition to 0.01–1.0%, by weight based on the total weight of the polymer, t-alkyl hydroperoxide, t-alkyl peroxide, or t-alkyl perester wherein the t-alkyl group includes at least 5 Carbon atoms, preferably 0.01–1.0%, by weight based on the total weight of the polymer, of t-alkyl hydroperoxide wherein the t-alkyl group includes at least 5 Carbon atoms; and more preferably 0.01–1.0%, by weight based on the total weight of the polymer, of t-amyl hydroperoxide include, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, typically at a level of 0.01% to 3.0% by weight, based on the weight of total monomer. Redox systems using the same initiator(s) coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, sodium 2-hydroxy-2-sulfinatoacetic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used.

By "in the presence of 0.01–1.0%, by weight based on the total weight of said polymer, t-alkyl hydroperoxide, t-alkyl peroxide, or t-alkyl perester wherein the t-alkyl group includes at least 5 Carbon atoms" is meant that the cumulative amount of t-alkyl hydroperoxide, t-alkyl peroxide, or t-alkyl perester wherein the t-alkyl group includes at least 5 Carbon atoms which has been added to the reaction zone wherein at least some of the monomers are being converted to the emulsion polymer is 0.01–1.0%, by weight based on the total weight of the polymer; optionally wherein at least 95%, preferably the last 95%, by weight of the monomers are being converted to the emulsion polymer; optionally wherein at least 75%, preferably the last 75%, by weight of the monomers are being converted to the emulsion polymer; optionally wherein at least the last 50% by weight of the monomers are being converted to the emulsion polymer; and optionally wherein at least the last 20% by weight of the monomers are being converted to the emulsion polymer. The optional additional oxidant includes those listed hereinabove as conventional free radical initiators such as, for example, tert-butylhydroperoxide, hydrogen peroxide, ammonium persulfate, and the like. In certain embodiments of the present invention, it is advantageous to choose a mixture containing one hydrophilic initiator and the relatively hydrophobic t-alkyl hydroperoxide, t-alkyl peroxide, or t-alkyl perester wherein the t-alkyl group includes at least 5 Carbon atoms in order to increase the overall efficiency of the initiator system with regard to the initiation of the full range of hydrophilic and hydrophobic monomers; preferably the optional additional oxidant(s) are less than 50% by weight of the total amount of initiator/oxidant. In this embodiment the t-alkyl hydroperoxide, t-alkyl peroxide, or t-alkyl perester wherein the t-alkyl group includes at least 5 Carbon atoms initator(s) and optional at least one other oxidant may be used as such or as the oxidant component(s) of a redox system using the same initiator(s) coupled with at least one suitable reductant such as those listed hereinabove.

In one embodiment, after 90–99.7%, preferably 95–99.7%, of the monomers by weight, based on the total weight of the polymer, have been converted to polymer, at least half of the remaining monomer is converted to polymer in the resence of 0.01–1.0%, by weight based on the total weight of the polymer, of t-alkyl hydroperoxide, t-alkyl peroxide, or t-alkyl perester wherein the t-alkyl group includes at least 5 Carbon atoms; preferably in the presence of 0.01–1.0%, by weight based on the total weight of the polymer, of t-alkyl hydroperoxide wherein the t-alkyl group includes at least 5 Carbon atoms; and more preferably in the presence of 0.01–1.0%, by weight based on the total weight of the polymer, of t-amyl hydroperoxide. This part of the reaction may be effected as soon as 90–99.7%, preferably 95–99.7%, conversion of the monomers to polymer is completed in the same reaction vessel or kettle. It may be effected after a period of time, in a different reaction vessel or kettle, or at a different temperature than the preceding part of the polymerization. Preferred is the presence of t-alkyl hydroperoxide, t-alkyl peroxide, or t-alkyl perester wherein the t-alkyl group includes at least 5 Carbon atoms only after 90%, more preferably only after 95%, conversion of the monomers to polymer is completed.

The t-alkyl hydroperoxide, t-alkyl peroxide, or t-alkyl perester wherein the t-alkyl group includes at least 5 Carbon atoms, optional additional oxidant(s), and optional reductant (s) may be added, for example, together or separately, in one or more shots or gradually, whether uniformly or not, or in combinations thereof or variations thereon as is desired; they may be added neat, in solution, or emulsified in an appropriate medium.

Chain transfer agents such as, for example, halogen compounds such as tetrabromomethane; allyl compounds; or mercaptans such as alkyl thioglycolates, alkyl mercaptoalkanoates, and $C_4$–$C_{22}$ linear or branched alkyl mercaptans may be used to lower the molecular weight of the formed polymer and/or to provide a different molecular weight distribution than would otherwise have been obtained with any free-radical-generating initiator(s). Linear or branched $C_4$–$C_{22}$ alkyl mercaptans such as n-dodecyl mercaptan and t-dodecyl mercaptan are preferred. Chain transfer agent(s) may be added in one or more additions or continuously, linearly or not, over most or all of the entire reaction period or during limited portion(s) of the reaction period such as, for example, in the kettle charge and in the reduction of residual monomer stage.

In another aspect of the present invention the emulsion polymer may be prepared by a multistage emulsion polymerization process, in which at least two stages differing in composition are polymerized in sequential fashion. Such a process usually results in the formation of at least two mutually incompatible polymer compositions, thereby resulting in the formation of at least two phases within the polymer particles. Such particles are composed of two or more phases of various geometries such as, for example, core/shell or core/sheath particles, core/shell particles with shell phases incompletely encapsulating the core, core/shell particles with a multiplicity of cores, and interpenetrating network particles. In all of these cases the majority of the surface area of the particle will be occupied by at least one outer phase and the interior of the particle will be occupied by at least one inner phase. Each of the stages of the multi-staged emulsion polymer may contain the same monomers, surfactants, initiation system, chain transfer agents, etc. as disclosed herein-above for the emulsion polymer. In the case of a multi-staged polymer particle the Tg for the purpose of this invention is to be calculated by the Fox equation as detailed herein using the overall composition of the emulsion polymer without regard for the number of stages or phases therein. Similarly, the amount of acid monomer shall be determined from the overall composition of the emulsion polymer without regard for the number of stages or phases therein. The polymerization techniques used to prepare such multistage emulsion polymers are well known in the art such as, for example, U.S. Pat. Nos. 4,325,856; 4,654,397; and 4,814,373. The emulsion polymer is also contemplated to be formed in two or more stages, the stages differing in molecular weight. Blending two different emulsion polymers is also contemplated.

The emulsion polymer has an average particle diameter from 20 to 1000 nanometers, preferably from 70 to 300 nanometers. Particle sizes herein are those determined using a Brookhaven Model BI-90 particle sizer manufactured by Brookhaven Instruments Corporation, Holtsville N.Y., reported as "effective diameter". Also contemplated are multimodal particle size emulsion polymers wherein two or more distinct particle sizes or very broad distributions are provided as is taught in U.S. Pat. Nos. 5,340,858; 5,350,787; 5,352,720; 4,539,361; and 4,456,726.

The aqueous composition is prepared by techniques which are well known in the coatings art. First, if the coating composition is to be pigmented, at least one pigment is well dispersed in an aqueous medium under high shear such as is afforded by a COWLES® mixer. Then the aqueous emulsion polymer is added under lower shear stirring along with other coating adjuvants as desired. Alternatively, the aqueous emulsion polymer may be included in the pigment dispersion step. The aqueous composition may contain conventional coating adjuvants such as, for example, tackifiers, pigments, emulsifiers, crosslinkers, coalescing agents, buffers, neutralizers, thickeners or rheology modifiers, humectants, wetting agents, biocides, plasticizers, antifoaming agents, colorants, waxes, and anti-oxidants.

The solids content of the aqueous coating composition may be from about 10% to about 85% by volume. The viscosity of the aqueous composition may be from 0.05 to 2000 Pa.s (50 cps to 2,000,000 cps), as measured using a Brookfield viscometer; the viscosities appropriate for different end uses and application methods vary considerably.

The aqueous composition may applied by conventional application methods such as, for example, brush or paint roller, air-atomized spray, air-assisted spray, airless spray, high volume low pressure spray, air-assisted airless spray, and electrostatic spray.

The aqueous composition may be applied to a substrate such as, for example, plastic including sheets and films, glass, wood, metal such as aluminum, steel, and phosphate or chromate-treated steel, previously painted surfaces, weathered surfaces, cementitious substrates, and asphaltic substrates, with or without a prior substrate treatment such as a primer.

The aqueous composition coated on the substrate is typically dried, or allowed to dry, at a temperature from 20° C. to 95° C.

The following examples are presented to illustrate the invention and the results obtained by the test procedures.

Abbreviations

AA=acrylic acid
MAA=methacrylic acid
BA=butyl acrylate
AN=acrylonitrile
VA=vinyl acetate
EHA=2-ethylhexyl acrylate
MMA=methyl methacrylate
LMA=lauryl methacrylate
DI water=deionized water

EXAMPLE 1
Preparation of Aqueous Emulsion Polymer 826.5 g water was placed in a reactor along with 94.4 g nonionic nonylphenoxypolyethoxyethanol surfactant (70% aqueous solution), 16.4 g hydroxyethylcellulose, 0.99 g sodium persulfate, and 0.01 g iron(II) sulfate. A monomer emulsion consisting of 20.3 g water, 27.0 g nonionic nonylphenoxy polyethoxyethanol surfactant (40% aqueous solution), 279.4 g BA, and 1582.9 g VA was added gradually at a rate sufficient to maintain a reaction temperature of 78° C. A solution of 0.99 g sodium persulfate in 116.0 g water was added simultaneously with and spatially separated from the monomer emulsion feed. A solution of 5.16 g sodium acetate and 2.49 g acetic acid in 228.0 g water was fed into the reactor at the same time as the monomer emulsion stream. Feed rates of the monomer emulsion and persulfate initiator were coordinated to end at the same time. Once feeds were completed, the reactor was cooled to 60° C. and 0.25 g of tertamylhydroperoxide (85% active) in 11.6 g water, and 0.19 g sodium bisulfite in 11.6 g water were added to the reactor. Then, a 2.26 g tertamylhydroperoxide (85% active) in 17.4 g water, and 1.74 g sodium bisulfite in 14.5 g water was added to the reactor. Finally, 64 g water was added to the reactor and the polymer latex was cooled to room temperature and filtered.

Comparative Example A
Preparation of Aqueous Emulsion Polymer 826.5 g water was placed in the reactor along with 94.4 g of nonionic nonylphenoxypolyethoxyethanol surfactant (70% aqueous solution), 16.44 g hydroxyethylcellulose, 0.99 g sodium persulfate, and 0.01 g iron(II) sulfate. A monomer emulsion consisting of 20.3 g water, 27.0 g nonionic nonylphenoxypolyethoxyethanol surfactant (40% aqueous solution), 279.4 g BA, and 1582.9 g VA was added gradually at a rate sufficient to maintain a reaction temperature of 78° C. A solution of 0.99 g sodium persulfate in 116.0 g water was added simultaneously with and spatially separated from the monomer emulsion feed. A solution of 5.16 g sodium acetate and 2.49 g acetic acid in 228.0 g water was fed into the reactor at the same time as the monomer emulsion stream. Feed rates of the monomer emulsion and persulfate initiator were coordinated to end at the same time. Once feeds were completed, the reactor was cooled to 60° C. and 0.26 g tertbutylhydroperoxide (70% aqueous) in 11.6 g water, and 0.19 g sodium bisulfite in 11.6 g water was added to the reactor. Then, 2.38 g of tertbutylhydroperoxide (70% aqueous) in 17.4 g water, and 1.74 g sodium bisulfite in 14.5 g water was added to the reactor. Finally, 64 g water was added to the reactor and the polymer latex cooled to room temperature and filtered.

EXAMPLE 2
Formation of Aqueous Coating Compositions and Evaluation of Coated Substrates Aqueous flat (low gloss) coatings compositions were formulated as below

| Material | Grams |
| --- | --- |
| Ethylene Glycol | 8.44 |
| NATROSOL ™ PLUS 330 | 2.72 |
| COLLOID ™ 643 | 0.91 |
| TAMOL ™ 731 | 3.63 |
| IGEPAL ™ CO-630 | 0.91 |
| AMP-95 | 0.91 |

-continued

| Material | Grams |
| --- | --- |
| TRONOX ™ CR-813 | 56.7 |
| GLOMAX ™ LL | 68.04 |
| DURAMITE ™ | 90.72 |
| Water | 170.1 |

Ingredients above were mixed in a Cowles mixer and the following added in order under low shear mixing.

| | |
| --- | --- |
| Emulsion Polymer (55% solids) | 103.96 |
| TEXANOL ™ | 3.4 |
| COLLOID ™ 643 | 0.91 |
| Water | 17.52 |

Semi-gloss aqueous coating compositions were formulated as below

| Material | Grams |
| --- | --- |
| Propylene Glycol | 18.2 |
| TAMOL ™ 731 | 6.45 |
| FOAMASTER ® VL | 0.5 |
| TI-PURE ™ R-900 | 126.50 |
| Water | 31.0 |

Ingredients above were mixed in a Cowles mixer and the following added in order under low shear mixing.

| | |
| --- | --- |
| Emulsion Polymer | 232.29 |
| ROPAQUE ™ ULTRA | 14.40 |
| TEXANOL ™ | 4.83 |
| FOAMASTER ™ VL | 0.5 |
| ACRYSOL ™ RM-1020 | 14.2 |
| ACRYSOL ™ RM-825 | 0.25 |
| Water | 13.79 |

Scrub Resistance-measurement

The coating composition containing the aqueous emulsion-polymer of Example 1 and the coating composition containing the aqueous emulsion polymer of Comparative Example A at the same volume solids were drawn down on a single black vinyl chart. The compositions were drawn in such a way that the two compositions were placed side by side and drawn together by a single drawing with a 0.0762 mm (3-mil) Bird film applicator (152.4 mm (6 inch) width). Such a drawing assured that each composition formed a 7.5 cm wide coating on a single chart, and the two compositions had the same coating thickness. The sample was allowed to dry at room temperature (23° C. (73° F.) and 50% relative humidity) for 7 days. Abrasive scrub resistance was measured with a scrub machine (Gardner Abrasive Tester) using 10 g scrub medium and 5 ml water. A piece of 0.0254 mm (1 mil) thick and 76.2 mm (3 inch) wide vinyl shim was placed underneath the sample vinyl chart. The two side edges of the shim were in the center of each coating. The number of cycles at the first spot of each coating removed was recorded. The scrub resistance was reported as a percentage of number of cycles of the coating versus the comparative coating.

TABLE 2.1

Scrub Resistance Evaluation

| Emulsion Polymer | Example 1 | Comp. Ex. A |
| --- | --- | --- |
| Oxidant | t-AHP | t-BHP |
| Scrub in Flat (as % t-BHP control) | 124 | 100 |
| Scrub in SG (as % t-BHP control) | 109 | 100 |

The coated substrate of this invention containing the emulsion polymer of Example 1 exhibited improved scrub resistance relative to the comparative coated substrate containing the emulsion polymer of Comp. Ex. A.

EXAMPLE 3
Preparation of Aqueous Emulsion Polymer 1223.4 g water, 15.9 g anionic ammonium nonylphenoxy polyethoxy sulfate surfactant (60% active in aqueous solution), 1.18 g ammonia (28% aqueous), and 3.1 g ammonium persulfate were added to a reactor held at a temperature of 85° C. Then, a monomer emulsion including 498.1 g water, 5.64 g anionic ammonium nonylphenoxy polyethoxy sulfate surfactant (60% active in aqueous solution), 57.6 g MAA, 490.1 g STY, 608.5 g EHA, and 488.5 g MMA was formed. A 100 g quantity, of this material was transferred to the reactor initially, and then the rest was gradually added to the reactor such that the reaction temperature of 88° C. was maintained. At the same time, a solution of 1.9 g ammonium persulfate in 107.3 g water was fed at the same time as the monomer emulsion through a spatially separated port. The feed times of the monomer emulsion and persulfate initiator were coordinated to end at the same time. During the reaction, 7.8 g ammonia (28% aqueous) was added along with 101.8 g water. Upon completion of the feeds, the batch was cooled and 0.03 g FeSO$_4$ in 18.6 g water, 0.03 g ethylenediaminetetraacetic acid (EDTA) with 28.0 g water, 4.47 g tertamylhydroperoxide (85% active) with 75.5 g water, and 2.4 g sodium sulfoxylate formaldehyde with 75.5 g water was added to the reactor. The batch was then neutralized to a pH of 7.4 with ammonia (28% aqueous).

Comparative Example B

Preparation of aqueous emulsion polymer 1223.4 g water, 15.9 g anionic ammonium nonylphenoxy polyethoxy sulfate surfactant (60% active in aqueous solution), 1.18 g ammonia (28% aqueous), and 3.1 g ammonium persulfate were added to a reactor held at a temperature of 85° C. Then, a monomer emulsion including 498.1 g water, 5.64 g anionic ammonium nonylphenoxy polyethoxy sulfate surfactant (60% active in aqueous solution), 57.6 g MAA, 490.1 g STY, 608.5 g EHA, and 488.5 MMA was formed. 100 g of this material was transferred to the reactor initially, and then the rest was gradually added to the reactor such that the reaction temperature of 88° C. was maintained. At the same time, a solution of 1.9 g ammonium persulfate in 107.3 g water was fed at the same time as the monomer emulsion through a spatially separated port. The feed times of the monomer emulsion and persulfate initiator were coordinated to end at the same time. During the reaction, 7.8 g ammonia (28% aqueous) was added along with 101.8 g water. Upon completion of the feeds, the batch was cooled and a redox initiator including 0.03 g FeSO$_4$ in 18.6 g water, 0.03 g ethylenediaminetetraacetic acid (EDTA) with 28.0 g water, 4.7 g tert-butylhydroperoxide (70% active) with 75.5 g water, and 2.4 g sodium sulfoxylate formaldehyde with 75.5 g water was added to the reactor. The batch was then neutralized to a pH of 7.4 with ammonia (28% aqueous).

EXAMPLE 4
Formation of Aqueous Coating Compositions and Evaluation of Coated Substrates High gloss coating compositions were formulated as follows:

| Material | Grams |
| --- | --- |
| SURFYNOL ™ CT-151 | 3.86 |
| Ammonia (28%) | 0.45 |
| TEGO FOAMEX ™ 1488 | 1.09 |
| TI-PURE ™ R-900 | 57.88 |
| Water | 35 |
| ACRYSOL ™ RM-8W | 0.54 |

Ingredients above were mixed in a Cowles mixer and the following added in order under low shear mixing.

| | |
| --- | --- |
| Emulsion Polymer (44% solids) | 308.09 |
| TEXANOL ™ | 20.28 |
| TEGO FOAMEX ™ 1488 | 1.09 |
| Ammonia (28%) | 1.81 |
| Sodium Nitrite (15%) | 3.72 |
| Water | 2.02 |
| ACRYSOL ™ RM-8W | 0.36 |

TABLE 4.1

Evaluation of High Gloss Coatings for Scrub Resistance, Initial Gloss, Gloss Retention, and Exterior Durability

| Binder | Example 3 (t-AHP) | Comp. Ex. B (t-BHP) |
| --- | --- | --- |
| Scrub Resistance (as % t-BHP Control) | 124 | 100 |
| Gloss (14 days) | | |
| 20°/60° | 44/79 | 35/74 |
| Gloss Retention (QUV box, every 7 days) | | |
| UV-A: 20°/60° (week 1) | 32/72 | 25/67 |
| Gloss Loss in UV-A (%) | −27%/ −9% | −29%/ −9% |
| UV-B: 20°/60° (week 1) | −27%/69 | 19/63 |
| Gloss Loss in UV-B (%) | −39%/ −13% | −46%/ −15% |

The coated substrate of this invention containing the emulsion polymer of Example 3 exhibited superior scrub resistance, gloss, and gloss retention under conditions (QUV box) of accelerated outdoor durability relative to the comparative coated substrate containing the emulsion polymer of Comparative Example B. Additionally, the coated substrate of this invention containing the emulsion polymer of Example 3 should exhibit improved Dirt Pick -up Resistance as determined by ASTM Test Method #609, Water Swelling as determined by ASTM Test Method # 906, and Efflorescence when applied to a cementitious substrate as determined by Test Method #621 relative to the comparative coated substrate containing the emulsion polymer of Comp. Ex. B

EXAMPLE 5
Preparation of Aqueous Emulsion Polymer 1223.4 g water, 15.9 g anionic ammonium nonylphenoxy polyethoxy sulfate surfactant (60% active in aqueous solution), 1.18 g ammonia (28% aqueous), and 3.1 g ammonium persulfate were added to a reactor held at a temperature of 85° C. Then, a monomer emulsion comprising 498.1 g water, 5.64 g anionic ammonium nonylphenoxy polyethoxy sulfate surfactant (60% active in aqueous solution), 57.8 g methacrylic acid, 474.0 g styrene, and 624.3 g 2-ethylhexyl acrylate. 100 g of this material was transferred to the reactor initially, and then the rest was gradually added to the reactor such that the reaction temperature of 88° C. is maintained. At the same time, a solution of 1.9 g ammonium persulfate in 107.3 g water was fed at the same time as the monomer emulsion through a spatially separated port. The feed times of the monomer emulsion and persulfate initiator were coordinated to end at the same time. During the reaction, 7.8 g ammonia (28% aqueous) was added along with 101.8 g water. Upon completion of the feeds, the batch was cooled and a redox initiator comprising 0.03 g FeSO$_4$ in 18.6 g water, 0.03 g ethylenediamminetetraacetic acid (EDTA) with 28.0 g water, 4.47 g tert-amylhydroperoxide (85% active) with 75.5 g water, and 2.4 g sodium sulfoxylate formaldehyde with 75.5 g water was added to the reactor. The batch was then neutralized to a pH of 7.4 with ammonia (28% aqueous).

Comparative Example C 1223.4 g water, 15.9 g anionic ammonium nonylphenoxy polyethoxy sulfate surfactant (60% active in aqueous solution), 1.18 g ammonia (28% aqueous), and 3.1 g ammonium persulfate were added to a reactor held at a temperature of 85° C. Then, a monomer emulsion comprising 498.1 g water, 5.64 g anionic ammonium nonylphenoxy polyethoxy sulfate surfactant (60% active in aqueous solution), 57.8 g MAA, 474.0 g STY, and 624.3 g EHA was formed. 100 g of this material was transferred to the reactor initially, and then the rest was gradually added to the reactor such that the reaction temperature of 88° C. was maintained. At the same time, a solution of 1.9 g ammonium persulfate in 107.3 g water was fed at the same time as the monomer emulsion through a spatially separated port. The feed times of the monomer emulsion and persulfate initiator were coordinated to end at the same time. During the reaction, 7.8 g ammonia (28% aqueous) was added along with 101.8 g water. Upon completion of the feeds, the batch was cooled and a redox initiator comprising 0.03 g FeSO$_4$ in 18.6 g water, 0.03 g ethylenediamminetetraacetic acid (EDTA) with 28.0 g water, 4.7 g tertbutylhydroperoxide (70% active) with 75.5 g water, and 2.4 g sodium sulfoxylate formaldehyde with 75.5 g water was added to the reactor. The batch was then neutralized to a pH of 7.4 with ammonia (28% aqueous).

EXAMPLE 6

Formation of Aqueous Coating Compositions and Evaluation of Primer-coated Substrates Primer coating compositions were formulated as follows:

| | |
|---|---|
| Water | 46.46 |
| NATROSOL ™ 250 MHR | 0.50 |
| Propylene Glycol | 35.00 |
| TAMOL ™ 2001 (42.0%) | 10.18 |
| Aqueous Ammonia (28.0%) | 1.36 |
| DREWPLUS ™ L-475 | 1.00 |
| TI-PURE ™ R-706 | 165.00 |
| SNOFLAKE ™ | 187.42 |
| ATTAGEL ™ 50 | 1.00 |

Ground 15 min and then let down with:

| | |
|---|---|
| Water | 75.00 |
| Experimental Emulsion | 505.16 |
| TEXANOL 198 | 12.89 |
| DREWPLUS ™ L-475 | 2.00 |
| ACRYSOL ™ RM-2020NPR | 11.58 |
| ACRYSOL ™ RM-8W | 2.76 |
| Water | 30.58 |

The coated substrate of this invention containing the emulsion polymer of Example 5 should exhibit superior resistance to the migration of stains such as, for example, those generated by redwood or cedar substrates or by ink and marking pen marks on a substrate, through the coating relative to the comparative coated substrate containing the emulsion polymer of Comparative Example C.

EXAMPLE 7

Preparation and Evaluation of Leather Coatings

Two BA/AN/3 AA emulsion polymers having a Tg of −10° C. are prepared according to the processes of Example 1 and Comparative Sample A and are formulated as follows (parts by weight):

| | |
|---|---|
| EUDERM ™ Black D-C | 30 (Predispersed black pigment) |
| EUDERM ™ White D-CB | 100 (Predispersed white pigment) |
| EUDERM ™ Nappa Soft S | 100 (Soft anti-tack agent and filler, 25% solids) |
| Water | 345 |
| Emulsion Polymer | 425 |

1/1 ACRYSOL™ RM-1020 rheology modifier/water is added to a viscosity of 20 seconds Zahn #2.

The formulations are sprayed on 1 square foot pieces of corrected grain upholstery leather to give a wet add-on of 17 grams/square foot and dried for 2 minutes at 90° C. The basecoated leathers are draped on rods to air overnight. The following day they are compared for tack and then embossed with a plate having a goat print in a Carver press with 50 tons pressure for 3 seconds with a plate temperature of 80° C. The embossed leathers are evaluated for degree of cutting and print retention before and after milling for 6 hours. The coated leather including the emulsion polymer of this invention gives improved embossing properties and lower tack than the coated leather including the comparative emulsion polymer. In embossing, the resistance to cutting by the plate is decreased with the coating including the emulsion polymer of this invention while retaining good definition of the pattern of the plate. The lower tack allows hot stacking with lower levels of additives to decrease tack, thus allowing formulations with higher levels of flex and rub resistance.

EXAMPLE 8

Preparation and Evaluation of Paper Coatings

Two BA/VA/3 AA emulsion polymers having a Tg of 10° C. are prepared according to the processes of Example 1 and Comparative Sample A and are formulated into an aqueous coating composition and a comparative aqueous coating composition as follows (% based on dry weight):

58.1% clay 24.9% titanium dioxide 16.7% vinyl acetate/acrylic emulsion copolymer 0.3% carboxyl methyl cellulose thickener The paper coating of this invention should exhibit superior coating strength, as measured by a standard coating strength test, such as the IGT pick test relative the comparative paper coating.

Note: TAMOL™, ROPAQUE™ and ACRYSOL™ are trademarks of Rohm and Haas Company. FOAMASTER™ is a trademark of Henkel Corp. TI-PURE™ is a trademark of EL DuPont de Nemours. Co. TEXANOL™ is a trade mark of Eastman Chemical Co. SURFYNOL™ is a trade mark of Air Products and Chemicals, Inc. TEGO FOAMEX™ is a trade mark of Tego Chemie. NATROSOL™ is a trade mark of Aqualon Corp. COLLOID™ is a trade mark of Colloids, Inc. IGEPAL™ is a trade mark of Rhodia, Inc. TRONOX™ is a trade mark of Kerr-McGee, Inc. GLOMAX™ is a trade mark of Ga. Kaolin, Inc. DURAMITE™ is a trade mark of ECC America, Inc. EUDERM™ is a trademark of Bayer AG.

EXAMPLES 9–10 and Comparative Examples D–E
Preparation and Evaluation of Aqueous Luminescent Screen Coating Composition Comparative Example D. Preparation of aqueous emulsion polymer A four-necked, 5 liter round-bottom flask, equipped with a condenser, stirrer and thermometer is charged with 950 g DI water and 1.4 g Ammonium lauryl sulfate (27.5% total solids). The flask is heated to 85° C. under Nitrogen. A monomer emulsion mixture is prepared from 260 g DI water, 26.7g Ammonium lauryl sulfate, 18 g MAA, and 758 g BMA. Twenty grams of the monomer emulsion mixture is added to the flask. The transfer container is rinsed with 25 g DI water, which is then added to the flask. A solution of 1.2 g ammonium persulfate in 15 g DI water is added to the flask. After 15 minutes, the remaining monomer emulsion mixture and 1.2 g ammonium persulfate in 50 g DI water are gradually added to the flask over 180 minutes. After the addition is complete, the monomer emulsion mixture and catalyst containers are rinsed with a total of 35 g DI water, which is then added to the flask. After 30 minutes, the flask is allowed to cool. While the flask is cooling, 0.58 g 0.15% solution of Iron (II) sulfate heptahydrate is added to the flask. A solution of 0.58 g sodium hydrosulfite in 15 g DI water and a solution of 0.1 g t-butyl hydroperoxide (70% active) in 15 g water are added to the flask.

EXAMPLE 9
Preparation of Aqueous Emulsion Polymer

Example 9 is prepared as in Example 1 with the exception that the 0.1 g t-butyl hydroperoxide (70% active) is replaced with 0.095 g t-amyl hydroperoxide (85% active).

Comparative Example E. Preparation of aqueous emulsion polymer. Comparative Example E is prepared using the same monomer emulsion mixture as in Comparative Example D but the procedure is as follows: A four-necked, 5 liter round-bottom flask, equipped with a condenser, stirrer and thermometer is charged with 950 g DI water and 1.4 g Ammonium lauryl sulfate (27.5% total solids). The flask is heated to 65° C. under Nitrogen. Twenty grams of the monomer emulsion mixture is added to the flask. The transfer container is rinsed with 25 g DI water, which is then added to the flask. 5 g 0.15% solution of Iron (II) sulfate heptahydrate is added to the flask. 4.4 g t-butyl hydroperoxide (70% active) is then added to the flask followed by 0.2 g sodium hydrosulfite in 15 g DI water. After 15 minutes, the remaining monomer emulsion mixture and 2 g of D-Isoascorbic acid dissolved in 65 g DI water are gradually added to the flask over 180 minutes. After the addition is completed, the monomer emulsion mixture and D-Isoascorbic acid containers are rinsed with a total of 35 g DI water, which is then added to the flask. After 30 minutes, the flask is allowed to cool. While the flask is cooling 0.58 grams of sodium hydrosulfite in 15 g DI water and 0.1 g t-amyl hydroperoxide (85% active) are added to the flask.

EXAMPLE 10
Preparation of Aqueous Emulsion Polymer

The emulsion is prepared as in Comparative Example E with the exception that 4.2 g t-amyl hydroperoxide (85% active) replaces the 4.4 g t-butyl hydroperoxide (70% active) added to the kettle.

Evaluation of aqueous luminescent screen coatings containing Examples 9–10 and Comparative Examples D–E.

Luminescent screens used in cathode ray tubes suitable for use in televisions, computer screens and the like are prepared and evaluated according to the teachings of U.S. Pat. No. 5,922,394. It is expected that an ablative layer including the polymer of Example 9 would have a lower degree of surface irregularity than an ablative layer including the polymer of Comparative Example D. A further expected benefit is that either or both the onset of polymer volatilization and the completion of polymer volatilization will occur at lower temperature(s) for the polymer of Example 9 relative to the polymer of Comparative Example D. It is also expected that, when used in the deposition of a luminophor layer and/ or the ablative layer, the polymer made in Example 9 would generate a smaller quantity of residual ash than would the polymer made in Comparative Example D.

It is expected that an ablative layer including the polymer of Example 10 would have a lower degree of surface irregularity than an ablative layer including the polymer made of Comparative Example E. A further expected benefit is that either or both the onset of polymer volatilization and the completion of polymer volatilization will occur at lower temperature(s) for the polymer of Example 10 relative to the polymer of Comparative Example E. It is also expected that, when used in the deposition of a luminophor layer and/ or the ablative layer, the polymer of Example 10 would generate a smaller quantity of residual ash than would the polymer of Comparative Example E.

EXAMPLE 11 and Comparative Example F
Preparation and Evaluation of Minimum Film Formation Temperature for Aqueous Hydrophobic Emulsion Polymer Comparative Example F
Preparation of Aqueous Emulsion Polymer 100 g BA, 470 g MMA, 400 g LMA and 30 g MAA were combined with 450 g DI water, 6.9 g sodium carbonate and 30.5 g 28% sodium lauryl sulfate and emulsified with stirring. 5.2 g 28% sodium lauryl sulfate, 10 g of a 50% aqueous solution of methyl-$\beta$-cyclodextrin, and 400 g DI water were charged to a 3 liter multi-neck flask fitted with mechanical stirring. The flask contents were heated to 89° C. under nitrogen. To the stirred kettle contents were added 35 g monomer emulsion followed by 3.5 g ammonium persulfate in 10 g DI water. 30 g 50% ureido-functional monomer was added to the remainder of the monomer emulsion and gradual addition of the monomer emulsion was subsequently initiated. Reactor temperature was maintained at 87–89° C. throughout the polymerization. 20 g DI water was used to rinse the emulsion feed line to the reactor. After completion of the monomer emulsion addition unreacted monomer is expected to be less than 5% by weight of added monomers; the reactor was cooled to approximately 70° C. 10 ppm ferrous sulfate, 1 g t-butyl hydroperoxide and 0.5 g D-Isoascorbic acid in aqueous solutions were added. The polymer emulsion was neutralized to pH 9–10 with ammonium hydroxide.

EXAMPLE 11
Preparation of Aqueous Emulsion Polymer

The process was identical to that used to make Comparative Example F with the exception that the 1 g of 70% t-butyl hydroperoxide used in the monomer reduction stage was replaced with 0.95 g 83% t-amyl hydroperoxide added to the reactor neat.

PHYSICAL PROPERTIES OF AQUEOUS EMULSION POLYMERS:

| EXAMPLE | SOLIDS (wt %) | PARTICLE SIZE (nm) | pH | VISCOSITY (cps) | MFFT (° C.) |
|---|---|---|---|---|---|
| Comp. F | 50.3 | 125 | 9.3 | 790 | 31.4 |
| 11 | 50.0 | 126 | 9.3 | 712 | 29.2 |

The aqueous emulsion polymer of Example 11 of this invention exhibits a lower MFFT compared to Comparative Example F. It is expected that this difference would manifest in better film formation for aqueous coating compositions including the emulsion polymer of Example 11 of this invention compared to corresponding compositions including the. emulsion polymer of Comparative Example F.

What is claimed is:

1. An aqueous coating composition comprising an aqueous polymer formed by emulsion polymerization, said polymer having a glass transition temperature (Tg) from greater than 20° C. to 80° C., formed by the free radical polymerization of at least one ethylenically unsaturated nonionic acrylic monomer and 0–7.5%, by weight based on the total weight of said polymer, ethylenically unsaturated acid monomer in the presence of 0.01–1.0%, by weight based on the total weight of said polymer, t-alkyl hydroperoxide, t-alkyl peroxide, or t-alkyl perester wherein the t-alkyl group includes at least 5 Carbon atoms, and, optionally, at least one other oxidant.

2. A method for preparing an aqueous polymer by emulsion polymerization suitable for use in an coating composition comprising forming said aqueous polymer, said polymer having a glass transition temperature (Tg) from greater than 20° C. to 80° C., by the free radical polymerization of at least one ethylenically unsaturated nonionic acrylic monomer and 0–7.5%, by weight based on the total weight of said polymer, ethylenically unsaturated acid monomer in the presence of 0.01–1.0%, by weight based on the total weight of said polymer, t-alkyl hydroperoxide, t-alkyl peroxide, or t-alkyl perester wherein the t-alkyl group includes at least 5 Carbon atoms and, optionally, at least one other oxidant.

* * * * *